J. HIST.
POTATO DIGGER.
APPLICATION FILED JUNE 12, 1911.
1,014,394.
Patented Jan. 9, 1912.
2 SHEETS—SHEET 2.
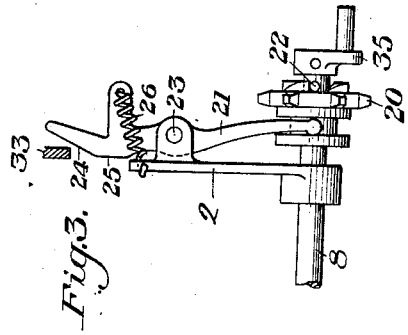
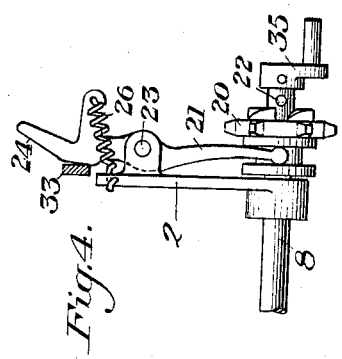
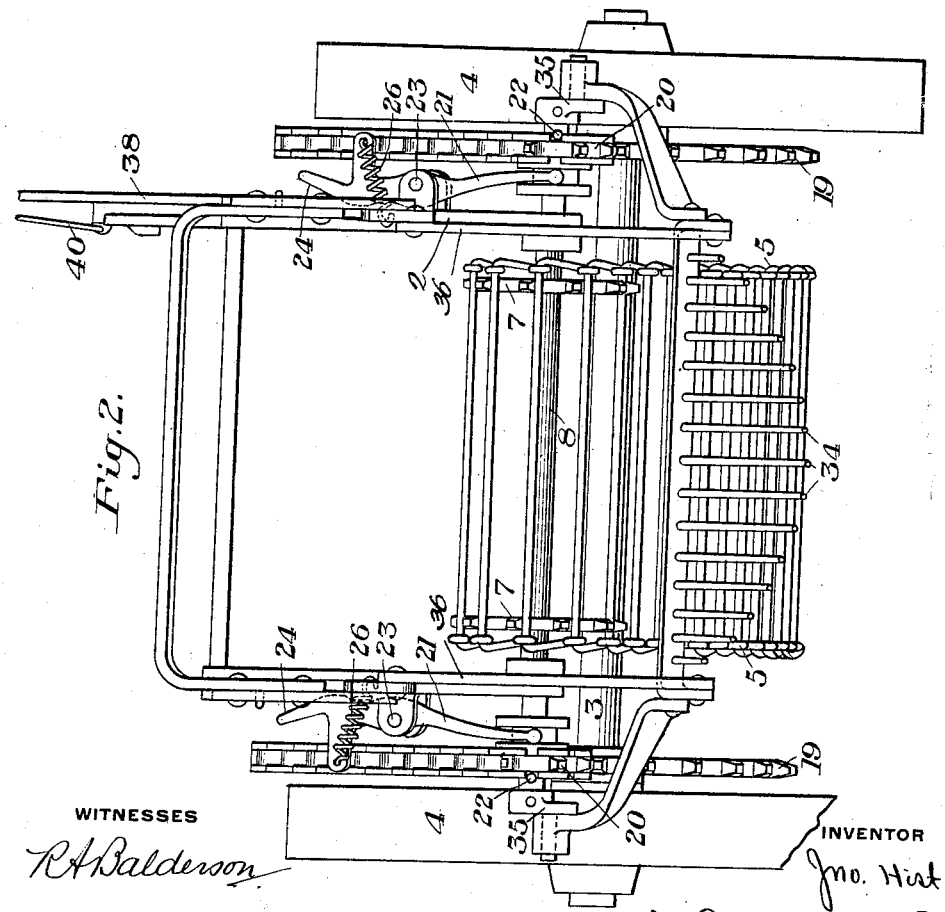
WITNESSES
INVENTOR

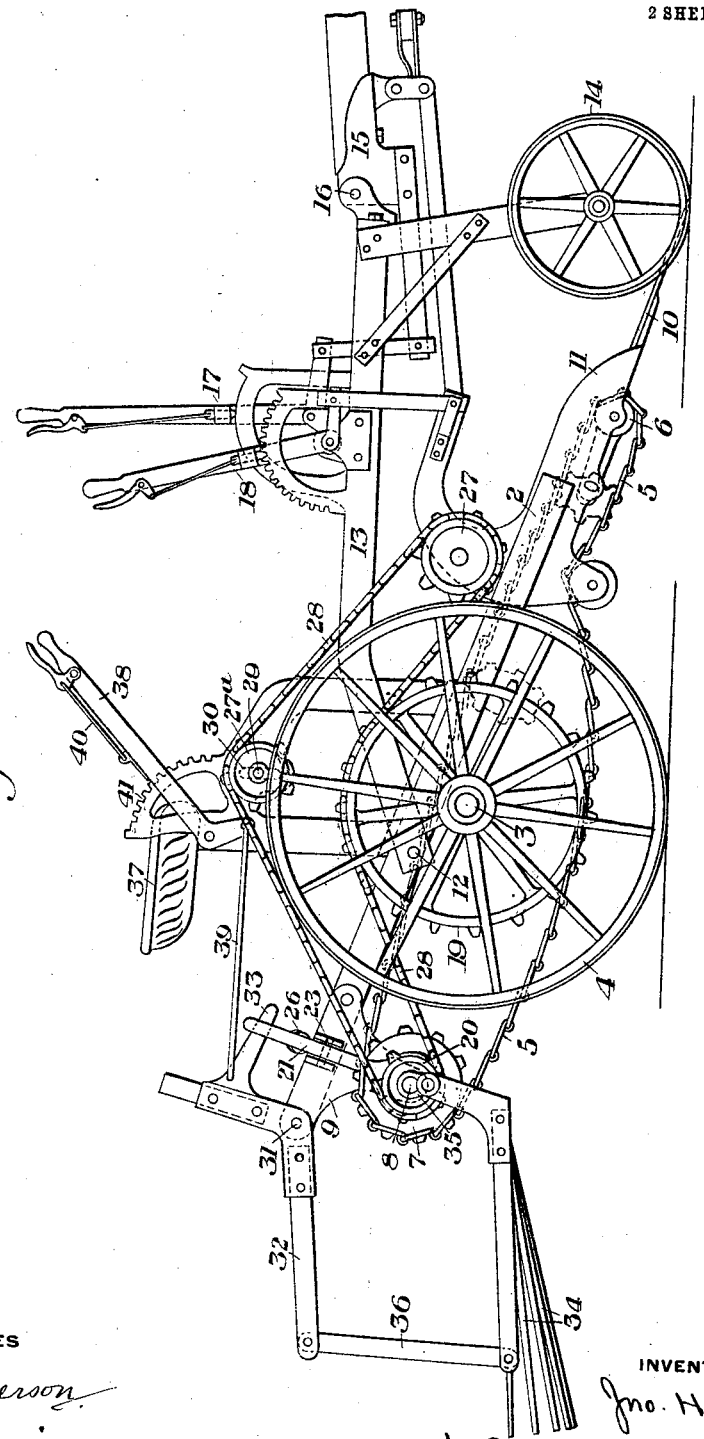

UNITED STATES PATENT OFFICE.

JOHN HIST, OF BEREA, OHIO.

POTATO-DIGGER.

1,014,394.

Specification of Letters Patent. Patented Jan. 9, 1912.

Application filed June 12, 1911. Serial No. 632,733.

*To all whom it may concern:*

Be it known that I, JOHN HIST, a resident of Berea, in the county of Cuyahoga and State of Ohio, have invented a new and useful Improvement in Potato-Diggers, of which the following is a full, clear, and exact description, reference being had to the accompanying drawings, forming part of this specification, in which—

Figure 1 is a side elevation of one form of machine embodying my invention. Fig. 2 is a partial rear view thereof, and Figs. 3 and 4 are detail views of the clutch throwing mechanism.

My invention relates to potato diggers and is designed to provide a cheap, efficient means for supporting the shaker and its driving mechanism on the main frame. Also in an arrangement of clutch mechanism which is adapted to be automatically disconnected by the movement of the shaker to disconnect the conveyer and shaker from the driving mechanism.

The precise nature of my invention will be best understood by reference to the accompanying drawings, which will now be described, it being premised, however, that various changes may be made in the details of construction and arrangement of parts, without departing from the spirit and scope of my invention as defined in the appended claims.

Referring to the drawings, the numeral 2 designates the main frame, 3 the axle, and 4 the supporting wheels. The main frame 2, together with the various parts connected thereto, is adapted to swing about the axis of the wheels when the main frame is adjusted as hereinafter described.

5 is an endless conveyer mounted on rollers 6 journaled on the front end of the main frame, and sprocket wheels 7 which are rigidly connected to a shaft 8 journaled in bearings 9 on the rear end of the main frame.

10 is the digging shovel which is connected to the front end of the main frame.

The journal pins of the rollers 6, are mounted in a yoke or bracket 11 connected to both sides of the front end of the main frame.

Pivotally connected to the main frame at 12 is an auxiliary frame 13 which is provided at its front end with the gage wheels 14.

15 is the tongue frame which is pivotally connected to the auxiliary frame at 16.

17 is the adjusting mechanism for adjusting the tongue frame with relation to the auxiliary frame, and 18 designates similar mechanism for adjusting the relative positions of the main and auxiliary frames.

Connected to each of the supporting wheels 4 or the axle 3, are the main driving sprocket wheels 19. Loosely journaled on the shaft 8 are the sprocket wheels 20, adapted to be moved longitudinally by their respective clutch levers 21. Each of these sprocket wheels 20 is provided with a plurality of ratchet teeth arranged to engage a pin or projection 22 on the shaft 8, to rotate it when the sprocket wheels are shifted into clutching position. The clutch levers are pivotally mounted at 23 between their ends. One end of each of these levers is forked and is arranged to be seated in an annular groove in its sprocket wheel, and the other end of each lever is provided with a cam face 24, and a flat face 25.

26 are springs, one end of each being connected to the main frame of the machine and the other end being connected to their respective levers 21. These are arranged to hold the sprocket wheels 20 in clutching engagement with the pins on the shaft 8.

Rotatably mounted on each side of the main frame and at the front thereof, are the idle sprocket wheels 27 and 27ª are also idle sprocket wheels, one on each side of the main frame.

28 are the driving sprocket chains, one on each side of the machine, each engaging its respective sprocket wheels 19, 20, 27 and 27ª and are arranged to drive the conveyer 5 and the shaker through the medium of the shaft 8. The sprocket wheels 27ª are each rotatably mounted on a pin 29, which is arranged to be adjusted in a slot 30 to adjust the tension of its respective driving sprocket chains.

Pivotally mounted at 31 to the rear end of the main frame is a supporting frame having rearwardly extending arms 52, and forwardly extending arms 33. The forwardly extending arms are arranged to engage the levers 21 to disengage the clutches, as hereinafter described.

34 designates the shaker having an arm on each side thereof journaled on cranks 35 fixedly connected to the ends of the shaft 8.

36 are links connecting the shaker 34 to the rearwardly extending arms 32, and are adapted to support and adjust the rear end of the shaker.

Pivotally mounted on the main frame and adjacent to the operator's seat 37, is a lever 38 having a link connection 39 with the shaker supporting frame, and arranged to adjust the height of the shaker.

40 is a spring actuated locking device, to engage the teeth in the stationary rack 41 for locking the shaker adjusting lever 38 in its adjusted position.

When the parts are in the position shown in Fig. 1, the conveyer and shaker will be actuated by means of the sprocket chains 28, which will in turn rotate the shaft 8. The loose soil and potatoes dug up by the shovel will be conveyed to the shaker by means of the conveyer 5, the small particles of earth and freed potatoes will drop to the ground through the conveyer, while the large lumps of ground and vines with attached potatoes will be carried to the shaker where the large lumps will be broken up and the potatoes shaken from the vines. When the parts are in the position shown in Figs. 1, 2 and 3, the sprocket wheels 20 will be in clutching engagement with the shaft, but when the shaker has been elevated to its highest point the forwardly extending arm 33 will engage the cam faces 24 of the clutch levers 21 and shift said levers against the action of their springs 26 and disconnect the ratchet teeth on the sprocket wheels 20 from the pins 22, as shown in Fig. 4, thereby permitting the sprocket wheels to freely rotate on the shaft, and allow the shaker and conveyer to remain stationary.

The advantages of my invention results from the provision of means for automatically disconnecting the driving mechanism from the driven shaft when the shaker is raised to its inoperative position.

It will readily be understood by those familiar with the art that changes in the clutches and clutch shifting mechanism, as well as in the driving mechanism can be made, without departing from my invention.

I claim:

1. A potato digger having a conveyer frame, a movable conveyer mounted on said frame, means for adjusting the conveyer frame, a receiving frame adjustably mounted on the conveyer frame arranged to receive the potatoes from the conveyer, driving mechanism for the conveyer including a clutch, means for adjusting the receiving frame with relation to the conveyer frame, and clutch shifting mechanism arranged to be actuated by the movement of the receiving frame; substantially as described.

2. A potato digger having a conveyer frame, a movable conveyer mounted on said frame, an auxiliary frame, means on the auxiliary frame for adjusting the conveyer frame, a receiving frame adjustably mounted on the conveyer frame arranged to receive the potatoes from the conveyer, a driving shaft for the conveyer mounted on the conveyer frame, driving mechanism for said shaft including a clutch, means for adjusting the receiving frame with relation to the conveyer frame, and clutch shifting mechanism arranged to be actuated by the movement of the receiving frame; substantially as described.

3. A potato digger having a conveyer frame, a movable conveyer mounted on said frame, means for adjusting the conveyer frame, a receiving frame adjustably mounted on the conveyer frame arranged to receive the potatoes from the conveyer, means on the receiving frame for agitating the material received from the conveyer, driving mechanism for the conveyer and agitating means on the receiving frame including a clutch, means for adjusting the receiving frame with relation to the conveyer frame, and clutch shifting mechanism arranged to be actuated by the movement of the receiving frame; substantially as described.

In testimony whereof, I have hereunto set my hand.

JOHN HIST.

Witnesses:
  E. J. KENNEDY,
  WM. H. AMES.